(No Model.)
G. L. ANDERS.
Electric Speaking Telephone.
No. 240,637.     Patented April 26, 1881.
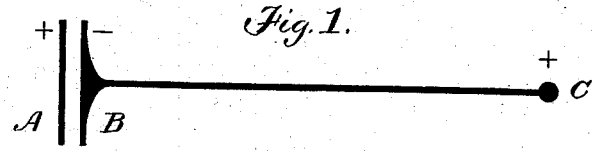
Fig. 1.
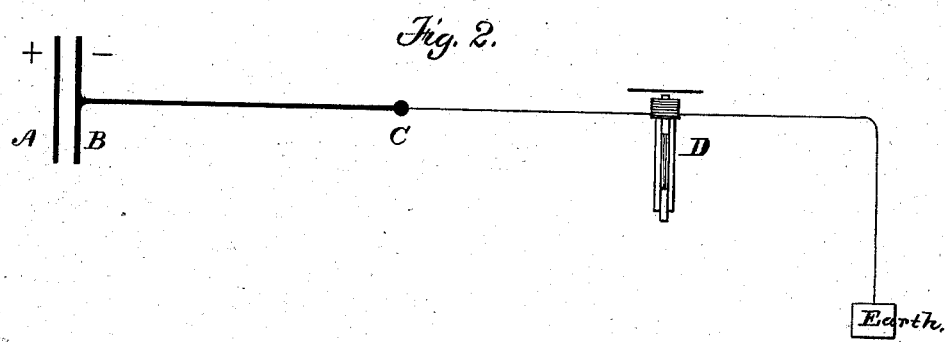
Fig. 2.
Fig. 3.
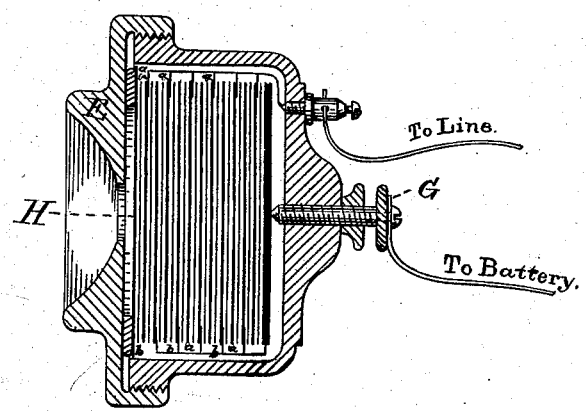
Fig. 4.
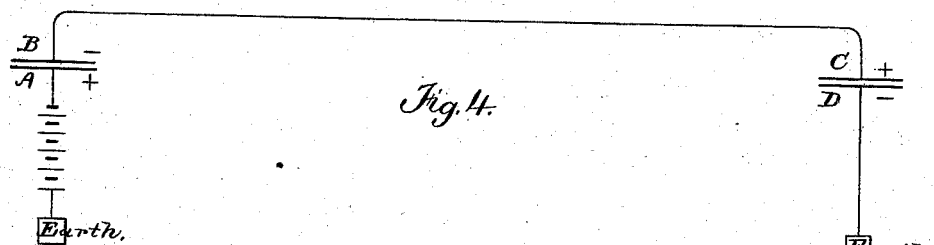
Witnesses.
Geo. Willis Pierce.
Thos. D. Lockwood
Inventor;
George Lee Anders
By his Atty.
Alex. L. Hayes

UNITED STATES PATENT OFFICE.

GEORGE L. ANDERS, OF BOSTON, MASSACHUSETTS, ASSIGNOR TO AMERICAN BELL TELEPHONE COMPANY, OF SAME PLACE.

ELECTRIC SPEAKING-TELEPHONE.

SPECIFICATION forming part of Letters Patent No. 240,637, dated April 26, 1881.

Application filed February 7, 1881. (No model.)

*To all whom it may concern:*

Be it known that I, GEORGE LEE ANDERS, of Boston, in the county of Suffolk and State of Massachusetts, have invented a new and useful Improvement in Electric Speaking-Telephones, of which the following is a description, reference being had to the drawings accompanying and forming part of this specification.

In the drawings, Figures 1 and 2 are diagrams illustrating the principle of my invention. Fig. 3 is a view, in section, of an apparatus showing how the principle of my invention can be embodied and carried into effect, and Fig. 4 is another diagram illustrating my invention.

My invention consists in an improved form of apparatus by means of which the vibration imparted by sound-waves to a body capable of acting on another body by static induction is caused thereby to create in a conductor electrical undulations similar in form to the air-vibrations which accompany and constitute the sounds to be transmitted.

If a metal plate, A, Fig. 1, charged with electricity of either polarity—say positive—be brought near to, but not in electrical contact with, one end of a conductor of a different potential—say an insulated neutral conductor, B C—a redistribution of electricity will be produced in the said conductor B C, its negative electricity will be drawn to the end B nearest the inducing-plate A, and its positive electricity will be repelled to the opposite end, C, as shown in Fig. 1. When the plate A is removed the positive and negative electricities on B C recombine and again exactly neutralize each other. While the negative electricity formerly distributed over the whole body B C is passing or being drawn toward the end B, and while, conversely, the positive electricity formerly distributed over the whole body is being repelled from B and caused to accumulate at C, an electrical movement, or something in the nature of a current, takes place. A reverse flow will occur while the plate A is being removed from near the end B. If the farther end of B C—say C—be connected to the earth, as shown in Fig. 2, (which virtually makes the whole of B C the mere end of an enormous conductor, of which the earth forms part,) the positive electricity of the metal conductor B C will, while A approaches B, be driven off to the earth, and electricity in the form of a short current or pulsation will pass through the instrument D, placed between C and the earth, while when the plate A is being moved away from B C a current will flow in the reverse direction through the instrument D, and in both cases, if the instrument D be capable of responding to the electrical movements or changes which take place, it will be operated thereby. An instrument which will respond to these electrical changes is the well-known "Bell telephone," the construction and operation of which is well known, and this instrument is represented at D. The duration, the direction, and violence of each of these short currents or pulsations will, other things being equal, depend upon, and therefore correspond to, the duration, extent, direction, and violence of the motions of the plate A which produce them.

I have described the phenomena which takes place when A is brought toward B from an infinite distance and again removed from it to an infinite distance. Phenomena which are similar but less in degree take place when A, being within the distance where it will inductively effect B, is brought a little nearer to it and removed a little farther from it.

If an arrangement be adopted like Fig. 4, but with the battery connected to plate B, and A connected to the earth, and D connected to earth, as shown, then the motions of A will, by the principles which govern electro-static induction, produce a redistribution of electricity in B C, and in the conductor of which D is a terminal, and a current will be produced between D and earth; but I do not consider this arrangement as desirable as that shown.

If the plate A be made of thin metal, such as is commonly used for the diaphragm of an electric speaking-telephone, and be placed as close as practicable to the plate B without being in electrical contact, and be insulated therefrom, and be then talked to, the vibrations which are produced in it by the sound-waves, and which, therefore, correspond to those sound-waves in "form" or "character," will produce corresponding changes in the electrical condition of the conductors B C and the parts connected with it, and thereby cause electrical impulses of a corresponding character to pass through the telephone D. An increased effect will be produced if a series of metal plates, each separated from one another by a thin layer of insulating material, be used instead of two plates for receiving the sound-waves, thus practically increasing the area of the plates in juxtaposition without making the apparatus of unwieldy size.

The line from B to the earth may be extended before making ground to any distance required in telephony, and the instrument D may be placed at the extremity most distant from B.

Fig. 3 is a sectional view of an apparatus by which my invention may be carried into effect, and which also may be used for receiving the electrical undulations and reproducing the sound-waves. It consists of a case, E, of wood, hard rubber, or other suitable insulating material, provided with a mouth-piece, F, and containing a series of thin metallic plates, a a a, such as sheets of tin-foil, or mica coated with tin-foil, separated from one another by sheets of paper, b b b, or other suitable dielectric. I have found mica coated with metallic foil particularly good, for the reason that mica plates possess a certain rigidity and capacity for vibration. These metallic plates are connected in alternate series to the line and to a battery of a large number of small cells, by means of which one series of plates is charged to a constant potential. The last metallic plate of the series connected to the battery is a little thicker than the others and rests upon a screw, G, by means of which the plates may be pressed together to a greater or less degree. The battery-wire may be connected to this screw. Above the last plate of the other series is placed the diaphragm H, for receiving the sound-waves. The plates a a a are pressed together loosely, so that the action of the sound-waves upon the diaphragm will cause a variation in the distance between the plates, and the consequent production in the line of electrical undulations similar in form to the sound-waves, as hereinbefore explained.

If the farther extremity of the conductor is connected to a metallic plate which is separated by a dielectric from another metallic plate connected to the earth, as shown in Fig. 4, the electrical undulations produced in the conductor will cause the two plates to be attracted toward and repelled from one another, so as to produce vibrations and sound-waves similar in form to the said electrical undulations. These sound-waves will be intensified by having several plates superimposed upon one another, with a layer of a suitable dielectric between each of the plates, and therefore an instrument similar to that used at the transmitting end of the line may be used for receiving the electrical undulations and reproducing the sound-waves.

Instead of a battery, any other means known to electricians may be used for suitably charging the plates to a constant potential.

The arrangement of alternate plates of metal and insulating material may be effected by folding together sheets of a metallic foil and a suitable dielectric.

What I claim as my invention, and desire to secure by Letters Patent, is—

1. The method, substantially as and for the purpose set forth, of producing in a conductor electrical undulations corresponding in form to sound-waves by vibrating, by said sound-waves in proximity to said conductor, a body charged with electricity, whereby the electricity of the conductor is caused to be redistributed, substantially as described.

2. The method, substantially as and for the purpose set forth, of producing in a conductor electrical undulations corresponding in form to sound-waves by vibrating a conductor in the presence of an insulated charged conductor, whereby a redistribution of electricity is caused in said conductors and in others in inductive proximity thereto, substantially as set forth.

3. The combination, substantially as and for the purpose set forth, of a metallic plate, A, charged to a constant potential and capable of being vibrated by sound-waves, a metallic plate, B, in proximity to said plate A, but electrically insulated therefrom, a conductor connected to the plate B, and a telephonic receiver or other apparatus capable of being affected by electrical undulations and reproducing sound-waves corresponding in form to said electrical undulations connected to the conductor.

4. The combination, substantially as and for the purpose set forth, of the case E, the diaphragm H, the series of metallic plates a a a, separated from one another by the insulating-plates b b b, said metallic plates being connected in alternate series and having one series charged to a constant potential and the other series connected to the line, and means for compressing said plates to a greater or less degree.

5. A telephonic receiver composed of a case, E, a diaphragm, H, two or more metallic plates, each insulated from the one next to it, and having one plate or series connected to a conductor whose potential is varied and the other plate or series connected to earth, substantially as and for the purpose set forth.

In witness whereof I have hereunto set my hand in the presence of the subscribing witnesses.

GEORGE LEE ANDERS.

Witnesses:
ALEX. L. HAYES,
W. C. TOMPKINS.